(12) United States Patent
Watkins

(10) Patent No.: US 6,665,859 B2
(45) Date of Patent: *Dec. 16, 2003

(54) BITSTREAM GENERATION TOOLS FOR BITSTREAM MANAGEMENT SYSTEM

(75) Inventor: Daniel Watkins, Saratoga, CA (US)

(73) Assignee: LSI Logic Corporation, Milpitas, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/386,088

(22) Filed: Aug. 30, 1999

(65) Prior Publication Data

US 2003/0172324 A1 Sep. 11, 2003

(51) Int. Cl.[7] .................................................. G06F 9/44
(52) U.S. Cl. ........................ 717/110; 717/101; 717/120; 717/130
(58) Field of Search ................................. 717/110, 130, 717/101, 120; 704/504; 725/41

(56) References Cited

U.S. PATENT DOCUMENTS 6,026,232 A * 2/2000 Yogeshwar et al. ......... 345/719
6,167,083 A * 12/2000 Sporer et al. ........... 375/240.01

OTHER PUBLICATIONS

Brightwell et al., "Flexible switching and editing of MPEG–2 video bitstreams", IEEE, pp. 547–552, 1997.*

Cornog et al., "Extensions to nonlinear editing encompassing MPEG–2 4:2:2 profile", IEEE, pp. 302–307, Sep. 1997.*

Wells, "Transparent Concatenation of MPEG Compression", BBC Research and Development, EBU Technical Review, pp. 1–13, 1998.*

Talluri, "Error Concealment by Data Partitioning", CiteSeer, http://citeseer.nj.nec.com/cs, p. 0–19, 1997.*

* cited by examiner

*Primary Examiner*—Tuan Q. Dam
*Assistant Examiner*—Ted T. Vo
(74) *Attorney, Agent, or Firm*—Christopher P. Maiorana, PC

(57) ABSTRACT

An apparatus comprising a first tool configured to generate one or more parameter signals in response to (i) one or more control signals and (ii) an input signal and a second tool configured to generate one or more edited bitstreams in response to (i) one or more bitstreams and (ii) the one or more parameter signals.

22 Claims, 3 Drawing Sheets

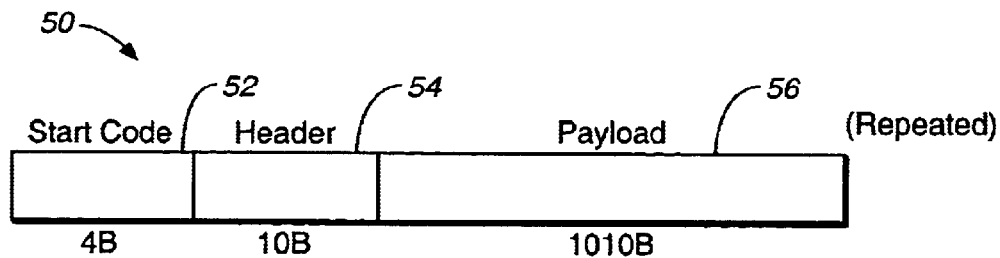
FIG._1
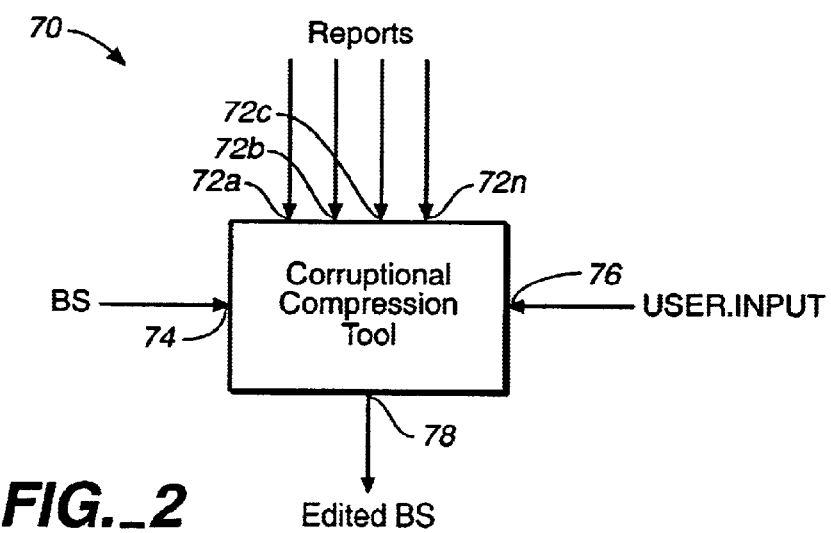
FIG._2
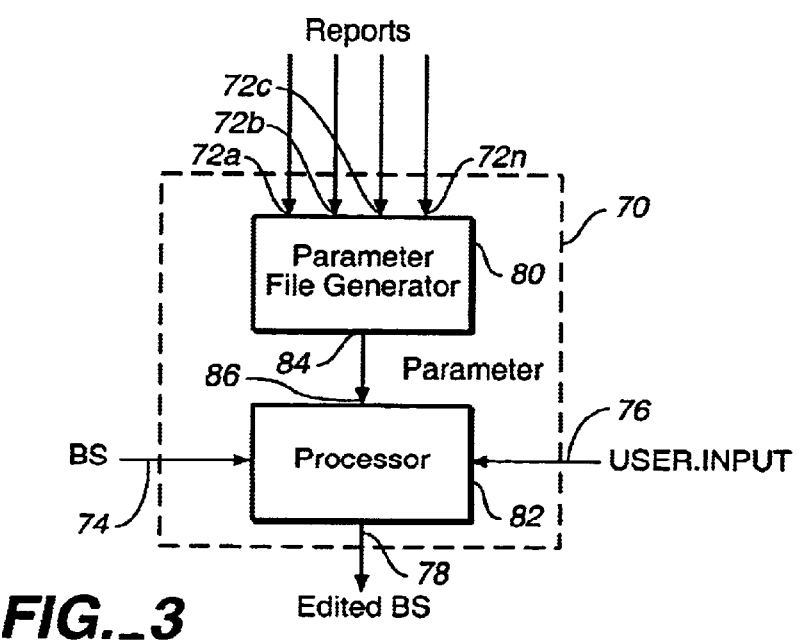
FIG._3

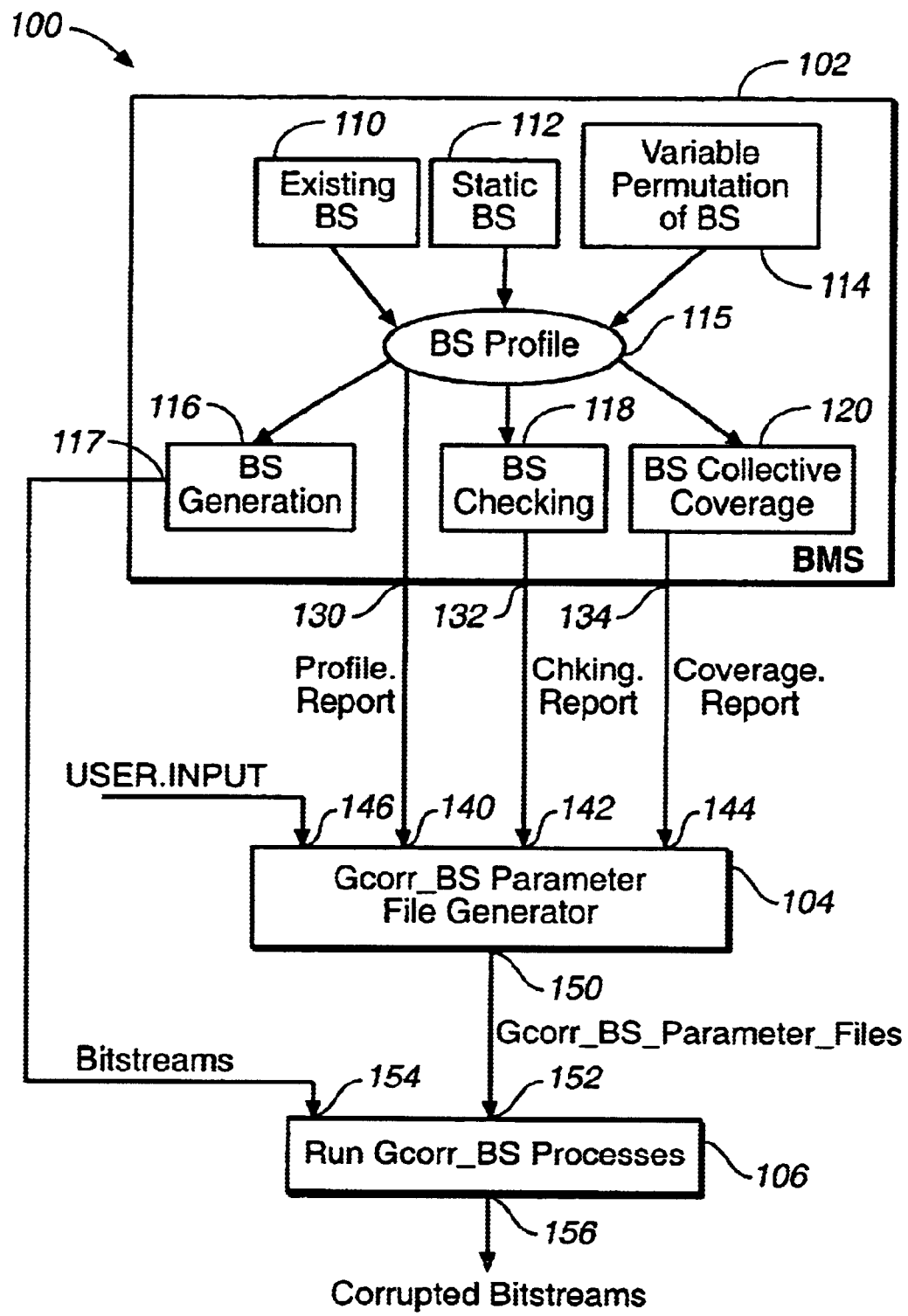
FIG._4

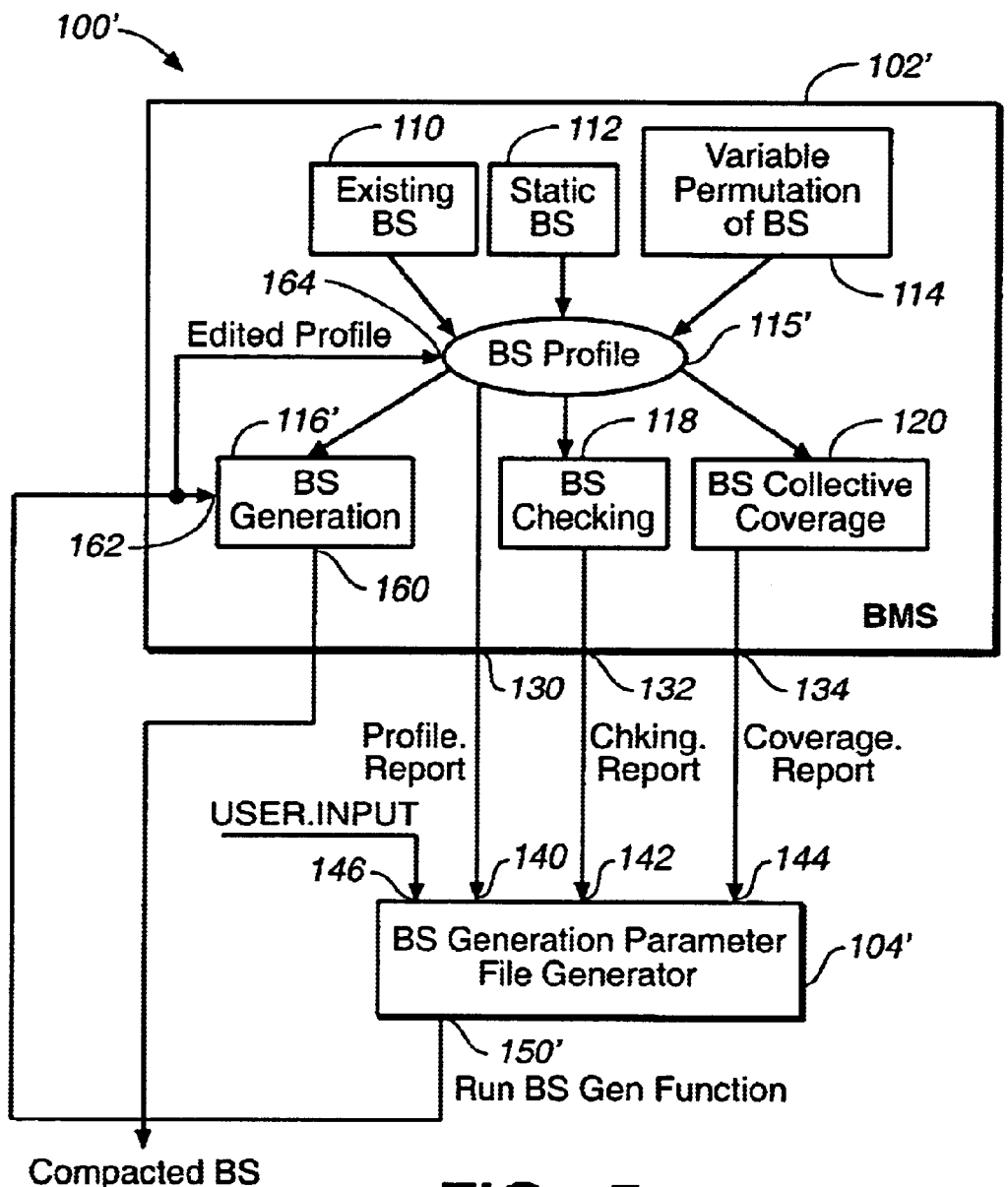
FIG._5

BITSTREAM GENERATION TOOLS FOR BITSTREAM MANAGEMENT SYSTEM

CROSS-REFERENCE TO RELATED APPLICATIONS

This application may relate to co-pending application Ser. No. 08/838,798, now U.S. Pat. No. 5,983,022, which is hereby incorporated by reference in its entirety.

FIELD OF THE INVENTION

The present invention relates to bitstream management systems generally and, more particularly, to a bitstream corruption/compression tool for a bitstream management system.

BACKGROUND OF THE INVENTION

Bitstreams are common in digital video and digital audio is systems. Corrupted bitstreams are used to uncover problems in the designs, such as lockup conditions. In the past, specific bitstream structure corruption tools have been used. However, such tools are limited in capability and applicability. An example of a specific bitstream corruption tool is the tool used to corrupt an audio frame adequately to generate a CRC error signal.

The disadvantage with such a tool is specific use constrains limit re-use applicability. For example, hard coding based on a bitstream specific structure makes it more difficult to re-use the tool. Additionally, advanced features such as protection of fields from corruption, are not supported with such tools.

Other stand-alone tools for bitstream corruption require the user to specify the tool parameters. Such parameter specification is typically not efficient, since such programming can be a tedious, arduous, process requiring review of what fields should be corrupted and what fields should be protected from corruption. Such a selection process must be repeated on each pass for each bitstream available for corruption.

The disadvantage with such an approach is the lack of automation of corrupted bitstream generation based on bitstream characterization reports. The lack of higher level constructs to instruct the use of the bitstream corruption tool is another disadvantage.

Additionally, existing bitstreams generated by such corruption tools are used for regressions, without incorporating compaction concepts. Such uncompressed bitstreams, corrupt or not, create a lengthy process of verification, since the huge bitstreams require large amounts of time and CPU resources to run.

The disadvantage with such an approach is that it fails to provide (i) compression or compaction of the generated bitstreams, (ii) small, high coverage, bitstreams, and (iii) higher level constructs to create dense bitstreams.

SUMMARY OF THE INVENTION

The present invention concerns an apparatus comprising a first tool configured to generate one or more parameter signals in response to (i) one or more control signals and (ii) an input signal and a second tool configured to generate one or more edited bitstreams in response to (i) one or more bitstreams and (ii) the one or more parameter signals.

The objects, features and advantages of the present invention include providing a programmable bitstream compression/corruption tool that may (i) be used on a variety of bitstreams for a variety of corruption needs, (ii) provide a full spectrum of corruption ranging from full random corruption to field occurrence specific corruption, and/or (iii) provide corruption at different rates within a particular bitstream.

One aspect of the present invention includes providing a testing and verification system that may (i) automatically generate useful corrupted bitstreams, and/or (ii) specify fields in a bitstream to have specific levels of corruption based on the bitstream characterization reports, such as bitstream management system (BMS) reports.

Another aspect of the present invention includes providing a system that may (i) automatically generating useful, high coverage (up to comprehensive), compact bitstreams, (ii) rile provide self-assessment of syntax compliance and coverage of particular bitstream sets, (iii) provide bitstream compaction of existing bitstream(s) down to the essence of the coverage of the original bitstream, and/or (iv) generate compact, high coverage bitstreams (e.g., down to the field level).

BRIEF DESCRIPTION OF THE DRAWINGS

These and other objects, features and advantages of the present invention will be apparent from the following detailed description and the appended claims and drawings in which:

FIG. 1 illustrates an example of a portion of a bitstream that may be used with the present invention;

FIG. 2 illustrates a block diagram of a preferred embodiment of the present invention;

FIG. 3 illustrates a more detailed block diagram of the corruption/compression tool of the present invention;

FIG. 4 illustrates a block diagram of an alternate embodiment of the present invention; and FIG. 5 illustrates an alternate embodiment of the present invention.

DETAILED DESCRIPTION OF THE PREFERRED EMBODIMENTS

The present invention may provide a programmable corruption/compression tool and method for using the tool. The present invention may enable a wide range of bitstream corruption/compression. The present invention may add significantly to the design verification techniques and capabilities needed to achieve comprehensive verification time to market and time to volume windows.

Referring to FIG. 1, an example of a bitstream 50 used in the present invention is shown. The bitstream 50 generally comprises a start code portion 52, a header portion 54 and a payload section 56.

Referring to FIG. 2, a block diagram of a tool 70 is shown implementing a preferred embodiment of the present invent ion. In a preferred embodiment, the tool 70 may be implemented in software. Alternately, the tool 70 may be implemented as a hardware device. One software implementation of the present invention may be in an electronic computer aided design (ECAD) system. However, other systems may be used accordingly to meet the design criteria of a particular implementation. The tool 70 generally comprises a number of inputs 72a–72n, an input 74, an input 76 and an output 78. The input 74 may receive a bitstream (e.g., RS) The inputs 72a–72n may receive one or more of reports, also referred to as specifications, that may provide information about the bitstream BS. The input 76 may receive a control signal (e.g., USER.INPUT). The output 78 may present an edited bitstream (e,g., EDITED_BS). The edited bitstream EDITED_BS may be an altered version of the bitstream BS received at the input 74. The edited bitstream EDITED_BS presented at the output 78 may be (i) a corrupted version of the bitstream received at the input 74, (ii) a compressed version of the bitstream received at the input 74 or (iii) a combination of an edited bitstream and a corrupt bitstream received at the input 74. Additionally, the edited bitstream EDITED_DS may have one or more types of corruption and/or one or more types of compression.

Referring to FIG. 3, a more detailed diagram of the tool 70 is shown. The tool 70 generally comprises a parameter tool 80 and a processor tool 82. The parameter file generator tool may generate a signal (e.g., PARAMETER) and an output 84 that may be presented to an input 86 of the processor tool 82. The processor tool may generate the edited bitstream BITSTREAM_BS at the output 78 in response to the signal PARAMETER, the bitstream BS and the signal USER.INPUT.

Referring to FIG. 4, a block diagram of a circuit (or tool) 100 is shown implementing an example of the present invention. The tool 100 may be a bitstream corruption tool. The tool 100 generally comprises a tool (or circuit) 102, a tool (or circuit) 104 and a tool (or circuit) 106. The tool 106 may be an output/processes tool. The tool 104 may be a file generator tool. The tool 102 may be a bitstream management software system, such as that found in co-pending application Ser. No. 08/838,798, now U.S. Pat. No. 5,983,022, which is hereby incorporated by reference in its entirety.

The bitstream management software tool 102 generally comprises a block (or circuit) 110, a block (or circuit) 112, a block (or circuit) 114, a block (or circuit) 115, a block (or circuit) 116, a block (or circuit) 118 and a block (or circuit) 120. The block 110 may receive an existing bitstream. The block 112 may receive a static bitstream. The block 114 may receive a variable permutation of the bitstream. The block 115 may be a bitstream profile block.

The bitstream profile block 115 generally receives signals from the block 110, the block 112 and the block 114 and generally presents the signals to a block 116, the block 118 and the block 120. The block 116 generally presents the bitstreams at an output 117.

The block 116 may be a bitstream generation block. The block 118 may be a bitstream checking block. The block 120 may be a collective coverage block. The bitstream management system 102 may have an output 130, an output 132 and an output 134. The output 130 may present a signal (e.g., PROFILE.REPORT) to an input 140 of the file generator block 104. The output 132 may present a signal (e.g., CHKING.REPORT) to an input 142 of the file generator 104. The output 134 may present a signal (e.g., COVERAGE.REPORT) to an input 144 of the file generator 104. A signal (e.g., USER_INPUT may be presented to an input 146 of the file generator 104). The file generator 104 may present a signal (e.g., GCORR_BS_PARAMETER_FILES) at an output 150. The signal GCORR_BS_PARAMETER_FILES may be received at an input 152 of the output/processes block 106. The bitstreams may be presented to an input 154 of the output/processes block 106. The output/processes block 106 may present the corrupted bitstreams at an output 156 in response to the bitstreams received at the input 154 and the signals GCORR_BS_PARAMETER_FILES.

The following syntax illustrates an example of a software implementation of the present invention: gcorr_bs fname every_xB corrupt_yB #_of_fields_to_corr #_of_ fields_to_protect corr_fields_location corr_fields_size corr_fields_freq corr_fields_occurrences prot_fields_ location prot_fields_size prot_fields_freq prot_fields_ occurrences.

The command gcorr_bs may be a command to call (e.g., begin execution) the tool. The command fname may be the filename of the input bitstream. The command(s) every_xB, every x bytes may specify the range of the bitstreams. The value x generally needs to be between 0 and the maximum bytes in the input bitstream. The command(s) corrupt_yB, corrupt y bytes may specify the level of corruption of the bitstreams. For every x bytes, corrupt y bytes. In one example, every_xB/corrupt_yB may be less than 8 for reasonable corrupted bitstreams that still enable partial operation of the unit under test. The command #_of_ fields_to_corr generally defines the number of field(s) to corrupt. The command #_of_fields_to_protect generally defines the number of field(s) to protect.

The command corr_fields_location generally defines the location of the field(s) to corrupt. The command corr_ fields_size generally defines the size of the field(s) to corrupt. The command corr_fields_freq generally defines the frequency of the field(s) to corrupt. The command corr_fields_occurrences generally defines the number of occurrences of the field(s) to corrupt. The command prot_ fields_location generally defines the location of the field(s) to protect. The command prot_fields_size generally defines the size of the field(s) to protect. The command prot_ fields_freq generally defines the field to protect frequency. The command prot_fields_occurrences generally defines the field to protect occurrences.

A specific implementation of the present invention may be illustrated by the following example: gcorr_bs in.bs 64 8. This implementation would corrupt a bitstream called in.bs on average 8 bytes out of every 64 bytes.

Another implementation of the present invention may be illustrated by the following example: gcorr_bs in.bs 32 4 1 0 1024 1 1024 all. This would corrupt a bitstream called in.bs on average 4 bytes every 32 bytes of the 1 byte field that occurs every 1024 bytes.

Another implementation of the present invention may be illustrated by the following example: gcorr_bs in.bs 64 4 0 1 0 0 0 0 2048 4 0 1. This would corrupt a bitstream called in.bs on average 4 bytes every 64 bytes except for the 4 byte field that starts at 2048 (this would not be corrupted).

Another implementation of the present invention may be illustrated by the following example: gcorr_bs in.bs 64 5 2 0 512 4 1024 6 580 3 1024 7. This would corrupt a bitstream called in.bs on average 5 bytes every 64 bytes in 6 occurrences of the first field that is 4 bytes in size and occurs at 512 and repeats at 1024, and in 7 occurrences of the second field that is 3 bytes in size and occurs at 580 and repeats at 1024.

The above examples are illustrative of the operation of the present invention. A wide variety of specific examples may be implemented to meet the design criteria of a particular application. For example, the present invention may provide a single tool for all bitstream corruption needs. A range of tool parameters that can be easily generated from other processes may also be supported. Full programmability for multiple field corruptions and protections may also be supported.

Multiple applications of the tool 100 may be run on subsequent processes on the bitstream. Such multiple applications may provide layers of corruption and protection of fields where the corruption may operate on different fields.

Particular data payloads may be capable of sustaining very high rates of corruption, where the header syntax start code may need a small rate of corruption and the rest of the syntax may need a mild rate of corruption.

A portion of the features of the present invention may be implemented on a particular portion of the bitstream. For example, protection of fields may be programmable with the present invention without additional modification, such as corruption.

Bitstream corruption is a necessary part of design verification of digital audio and video systems. The present invention may provide advanced features and usage methodology that may be used to save months in design verification work by providing a convenient system for stressing the systems' and sub-systems' capabilities in a programmable and systematic way in a short amount of time.

Another aspect of the present invention may provide automation of the features of the bitstream corruption tool 100. Automation of the present invention may leverage information available in BMS reports. An example of BMS reports may be found in the Bitstream Management System described in co-pending application Ser. No. 08/838,798, which is hereby incorporated by reference in its entirety. However, other bitstream management systems may be implemented accordingly to meet the design criteria of a particular implementation.

A BMS profile is generally a readable condensed version of the bitstream that can distinguish fields in the bitstream. A BMS checking report may specify, down to the field level, illegal portions of the bitstreams that have been run. A BMS coverage report may specify, down to the field level, what has not been covered (in terms of possible permutations) in the bitstreams that have been run. The BMS profile, the BMS checking report and the BMS coverage report may be generated by the bitstream management software.

The BMS profile, the BMS checking report and the BMS coverage report may provide input that may be used to specify the parameters for the sets of uses for the bitstream corruption tool 100. The BMS profile, the BMS checking report and the BMS coverage report may represent a single bitstream or many bitstreams.

The present invention may use user input on the desired corruption process to produce the corrupted bitstream sets to be used for verification. The BMS would have run the bitstream candidates for corruption through profiling, checking and coverage tools. These reports, along with optional user input, may be used to produce the corrupted bitstream set(s).

An example of the user input may be one or more of the following: (i) corrupt fields in profile, (ii) corrupt fields not in profile, (iii) corrupt legal fields in checking report, (iv) corrupt illegal fields in checking report, (v) corrupt fields in coverage report, (vi) corrupt fields not in coverage report (this means the fields have not been comprehensively covered), (vii) corrupt fields not in profile and not in coverage report, (viii) corrupt fields not in profile and illegal fields in checking report corrupt fields not in profile, illegal field in checking report and not in coverage report, (ix) corrupt illegal fields in checking report and not in coverage report, (x) corrupt all fields in profile, checking and coverage reports, (xi) corrupt start code field in profile at 16/1, rest of header syntax at 16/4 and all data payload at 64/32, (xii) corrupt fields not in coverage report with start code field in profile at 10/1, rest of header syntax at 10/3 and all payload at 64/64, and (xiii) corrupt fields in profile at 64/8, except for illegal fields in checking report which should be at 32/4. The user may provide input that may be used to specify which fields in the profile should have a particular level of corruption.

In the example below, the BMS coverage report may be processed to assess what fields are not covered. The bitstream is then corrupted in the fields that are not covered. The following example illustrates when a user has run a single bitstream through BMS profiler, checking and coverage tools and has reports from the tools. The user wants 'corrupt fields not in coverage report'.

The circuit 100 generates (e.g., from coverage report) what fields were not covered, and builds parameter file for gcorr_bs tool. Then, the gcorr_bs tool is run with the output being the corrupted bitstream that meets the specified requirements. In the above example, the file gcorr_bs may be received from the bitstream generation block 116, where >gcorr_bs in.bs 64 5 2 0 512 4 1024 6
    580 3 1024 7

Such an example would corrupt a bitstream called in.bs (i) on average 5 bytes every 64 bytes in 6 occurrences of the first field that is 4 bytes in size and occurs at 512 and repeats at 1024, and (ii) in 7 occurrences of the second field that is 3 bytes in size and occurs at 580 and repeats at 1024.

The present invention may be used as automated system for creating generic or custom corrupted bitstreams based on user input and existing reports on the makeup of the bitstream(s). The user input options may be verbose and may include options for specifying the corruption at various levels in various bitstreams. Higher level constructs may be used to specify what should be corrupted in the particular bitstream(s).

Particular aspects of the circuit 100 may be independently implemented. For example, an option may be implemented to allow the user to specifying what fields should have what level of corruption in a group of bitstreams and automatically having the corrupted bitstreams generated may be implemented.

Bitstream corruption is a necessary part of design verification of digital audio and video systems. The present invention provides a closed loop, automated system, for generating useful corrupted bitstreams to be used in verification using higher level constructs. For example, the user can input the higher level construct 'corrupt fields not in coverage report', and the system will instantly produce the corrupted bitstreams that stress the audio or video system (or sub-system) without needing to craft other bitstreams to complete field coverage. The present invention may provide a productivity improvement that may be reflected in schedules improved by weeks on large development.

The present invention may also enable generation of compact high coverage bitstreams. Referring to FIG. 5, a circuit 100' is shown illustrating an alternate embodiment of the present invention. The circuit 100' modifies the bitstream management software circuit 102' and the generator circuit 104'. The bitstream profile circuit 115' may be configured to receive an edited bitstream profile at an input 164. The edited bitstream profile may be received from the output 150' of the generator circuit 104'. The edited profile may also be presented to an input 162 of the bitstream generation block 116'. An output 160 of the bitstream generation circuit 116' may present a compacted bitstream (e.g., COMPACTED_BS). The BMS profiling function constructs a profile from an existing bitstream. The profile may be a readable condensed version of the bitstream that can distinguish fields in the bitstream. The BMS Bitstream Generation function may generate a bitstream based on the profile (which may have been edited since constructed). The BMS checking function may generate a report down to the field level on what is illegal in the bitstream(s). The BMS coverage report function may generate a report down to the field level on what has not been covered (in terms of possible permutations) in the bitstream(s).

The compact bitstream generation process may be implemented with all of the BMS functions. Examples of three user input choices will be presented in detail: (i) creating compact existing bitstreams, (ii) creating compact bitstream for verification of field x and (iii) creating compact bitstream for comprehensive coverage.

The compression aspect of the present invention may review the profiles of the existing bitstreams. A single profile is generally developed based on the bitstream profile reviews that generally represents a significant compaction.

The bitstream generator 104' may generate a bitstream based on the bitstream profile. The generated bitstream may be run through the checking and coverage tools to ensure the goals have been met (e.g., the same level of compliance and coverage as the existing bitstreams). If not, the profile may be refined to achieve the desired compliance.

An option may be implemented to ignore data size and value that may dramatically reduce the size of the bitstreams. A compact bitstream may be created for verification of field(s). The field must generally be specified in the same manner it is represented in the profile. The field coverage may not always be reasonable for audio or video experience, but will be legal and leverage existing coverage and, in large part, be useful in verification.

The profiles of the existing bitstreams may now be reviewed. A single profile is generally copied from an existing one and edited to add the field x coverage. The bitstream generation function generates a bitstream based on this single profile.

The generated bitstream is run through the checking and coverage tools to ensure the goals have been met (the level of compliance and coverage desired). If not, the profile is refined to achieve this.

An option may be implemented to create compact bitstream for comprehensive coverage.

A profile must exist to represent the bitstream fields to cover.

The coverage bitstream generated may not always be reasonable for audio or video experience, but will be legal and leverage existing coverage information, and in large part, be useful in verification with the various syntax permutations covered.

The profiles of the existing bitstreams are reviewed. A single profile is copied from an existing one and edited to add full coverage. The bitstream generation function generates a bitstream based on this single profile. The generated bitstream is run through the checking and coverage tools to ensure the goals have been met (the level of compliance and coverage desired). If not, the profile is refined to achieve this.

The present invention may provide (i) an automated system for creating compact bitstreams from existing bitstreams that substantially achieves the same level of coverage as the existing bitstreams, (ii) an automated system for creating compact bitstreams to achieve the desired coverage level of specific or all fields, and/or (iii) implement higher level constructs that may be used to specify compaction.

Part of the invention may be implemented on particular bitstreams, like compacting existing bitstreams, ignoring data size and value. For example, 250 Mytes could be reduced to one MByte, saving much time in development.

Bitstreams used in design verification of audio and video digital systems can be huge. This invention provides a system and methodology to compact large bitstreams and craft other compact bitstreams to accelerate design verification. The user may run all the legacy bitstreams for verification and on the next pass of the design run a compact bitstream to reduce the regression run time. This can save weeks on a large development.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first tool configured to generate one or more parameter signals in response to (i) one or more control, signals specifying a level of corruption and (ii) an input signal; and
   a second tool configured to generate one or more edited bitstreams each having at least one illegal portion in response to (i) one or more input bitstreams and (ii) said one or more parameter signals.

2. The apparatus according to claim 1, wherein said one or more parameter signals are automatically generated in response to (i) said one or more control signals and (ii) said input signal.

3. The apparatus according to claim 1, wherein said one or more edited bitstreams are corrupted versions of said one or more input bitstreams.

4. The apparatus according to claim 1, wherein said one or more edited bitstreams are compressed versions of said one or more input bitstreams.

5. The apparatus according to claim 1, wherein said one or more edited bitstreams are corrupted and compressed versions of said one or more input bitstreams.

6. A method or modifying one or more bitstreams, comprising the steps of:
   (A) receiving a specification specifying a level of corruption for a bitstream edit; and
   (B) executing an operation of the bitstream edit in response to a control signal to generate an edited bitstream having at least one illegal portion.

7. The method according to claim 6, wherein step (B) is performed automatically.

8. The method according to claim 6, wherein the specification for the bitstream edit is for a corruption having a number of specification options included, where one or more of the specification options for corruption are selected from a group consisting of:
   (i) every x bytes, corrupt y bytes;
   (ii) a number of fields to corrupt;
   (iii) a number of fields to protect;
   (iv) a field to corrupt location affiliated with (a) a field to corrupt size, (b) a field to corrupt frequency, and (c) a field to corrupt occurrences; and
   (v) a field to protect location affiliated with (a) a field to protect size, (b) a field to protect frequency, and (c) a field to protect occurrences.

9. The method according to claim 6, wherein other processes select at least one specification option for the specification and at least one value for the specification option.

10. The method according to claim 9, wherein the specification options for a corruption of the one or more bitstreams include (i) a number of sets of fields to corrupt, and (ii) a number of sets of fields to protect.

11. The method according to claim 6, wherein the method is used multiple times on a particular bitstream of the one or more bitstreams with the specification to produce one or more different edited bitstreams.

12. The method according to claim 6, wherein the method is used multiple times on a particular bitstream of the one or more bitstreams with different specifications such that different corruption rates are supported for at least one field of the edited bitstream.

13. The method according to claim 6, wherein the specification for a corruption can be random for at least one field of the one or more bitstreams to be corrupted.

14. The method according to claim 6, used in a system that automates a corruption of the one or more bitstreams, further comprising the steps of:

automating the specification to include automation for at one of (i) corrupt fields in a profile, (ii) corrupt fields not in the profile, (iii) corrupt legal fields in a checking report, (iv) corrupt illegal fields in the checking report, (v) corrupt fields in a coverage report, (vi) corrupt, fields not in the coverage report, (vii) corrupt fields not in the profile and nit in the coverage report, (viii) corrupt fields not in the profile and illegal fields in the checking report, (ix) corrupt fields not in the profile, illegal field in the checking report and not in the coverage report, (x) corrupt illegal fields in the checking report and not in the coverage report, (xi) corrupt all fields in the profile, the checking and the coverage reports, (xii) corrupt start code field in the profile at 16/1, rest of header syntax at 16/4 and all data payload at 64/32, (xiii) corrupt fields not in the coverage report with start code field in the profile at 10/1, rent of header syntax at 10/3 and all payload at 64/64, (xiv) corrupt fields in the profile at 64/8, except for illegal fields in the checking report at 32/4;

receiving available parameters on a particular bitstream of the one or more bitstreams from at least one of the profile, the checking report and the coverage report; and building sets of bitstream specifications based on automation specifications and the available parameters.

15. The method according to claim 14, wherein said system is used to generate sets of corrupted bitstreams.

16. The method according to claim 14, wherein the profile of the particular bitstream, representing field fragmentation, is used to automate the corrupt bitstream generation by specifying parameters.

17. The method according to claim 14, wherein the checking report of the particular bitstream, representing what fields and bits are illegal, is used to automate the corrupt bitstream generation by specifying parameters.

18. The method according to claim 14, wherein the coverage report of the particular bitstream, representing what field and bit permutations have not been used, is used to automate the corrupt bitstream generation by specifying parameters.

19. The method according to claim 14, wherein the profile, the checking report and the coverage report used for automation can represent multiple bitstreams of the one or more bitstreams.

20. The method according to claim 6, used in a system that automates compact bitstream generation for a plurality of existing bitstreams, further comprising the steps:

reviewing a plurality of profiles of the existing bit streams;

developing a single profile based on the reviewing that would represent a significant compaction;

generating the edited bitstream based on the single profile;

checking the edited bitstream to ensure compliance and coverage goals have been met, otherwise refining the single profile; and optionally ignoring a data size and a value to reduce a size of the edited bitstream.

21. The method according to claim 6, used in a system that automates compact bitstream generation for verification of at least one field, further comprising the steps of:

specifying the field in a same manner as represented in a profile;

reviewing a plurality of existing profiles of a plurality of existing bitstreams;

copying a single profile from the existing profiles;

editing the single profile to add a field coverage;

generating the edited bitstream based on the single profile; and checking the edited bitstream to ensure compliance and coverage goals have been met, otherwise refining the single profile.

22. The method according to claim 6, used in a system that automates compact bitstream generation for comprehensive coverage, further comprising the steps:

reviewing a plurality of existing profiles of a plurality of existing bitstreams;

copying a single profile from the existing profiles editing the single profile to add full coverage;

generating the edited bitstream based on the single profile; and checking the edited bitstream to ensure compliance and coverage goals have been met, otherwise refining the single profile.

* * * * *